Aug. 18, 1959        J. CELADA        2,900,247
METHOD OF MAKING SPONGE IRON
Filed Aug. 5, 1957
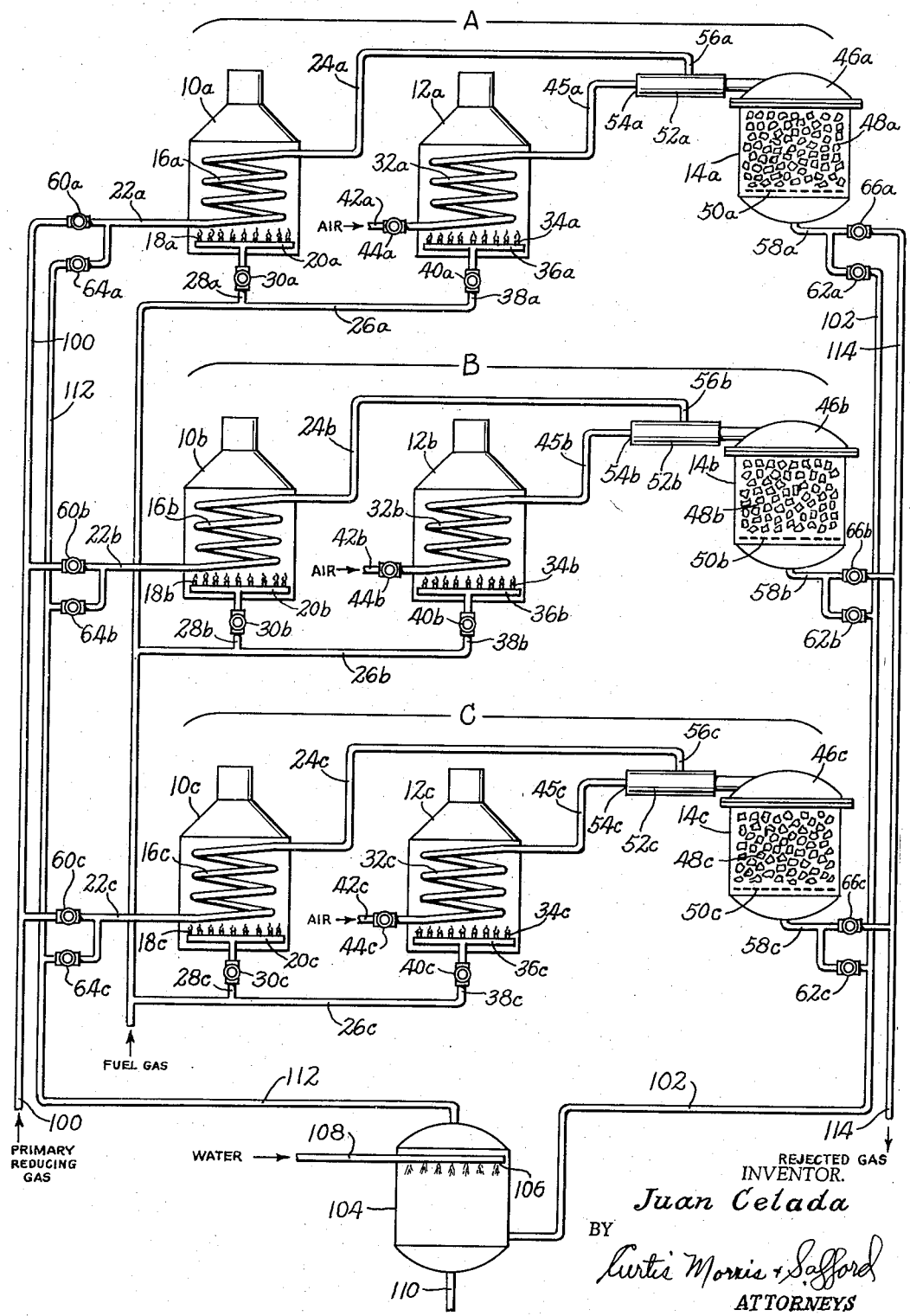
INVENTOR.
*Juan Celada*
BY
*Curtis Morris + Safford*
ATTORNEYS under the conditions of the process contemplated herein the several reduction units operate in the same manner, the operation of only one such unit, namely unit A, will be described.

United States Patent Office

2,900,247
METHOD OF MAKING SPONGE IRON

Juan Celada, Monterrey, Nuevo Leon, Mexico, assignor to Fierro Esponja Sa, Monterrey, Nuevo Leon, Mexico Application August 5, 1957, Serial No. 676,072

9 Claims. (Cl. 75—34)

This invention relates to the production of sponge iron by the reduction of iron ore with a reducing gas, and more particularly to a novel method of establishing and maintaining in a bed of iron ore reducing conditions that efficiently convert a relatively high proportion of the iron ore to solid metallic iron in a relatively short period of time.

For many years blast furnaces have been used almost exclusively for the conversion of iron ore into metallic iron and both their advantages and disadvantages are well understood. The blast furnace is a highly efficient converter of large quantities of iron ore to metallic iron, but it becomes relatively inefficient as its size is reduced. There are numerous situations wherein it is desired to produce relatively small quantities of iron and in such cases the large capital investment required to build a blast furnace of economical size and install its necessary auxiliary equipment cannot be justified. Hence there is a need for an efficient small scale process for reducing iron ore.

It has been known that iron ore in comminuted form can be heated in a reducing environment at a temperature somewhat below blast furnace temperatures to produce iron in a porous solid form known as sponge iron. Various processes for producing sponge iron have been proposed wherein reduction is effected by mixing the iron ore with coke or coal, or passing a reducing gas over a bed of the ore or over a mixed bed of ore and solid reducing agent. Since such processes do not require the large capital investment in equipment characteristic of the blast furnace, they are potentially capable of satisfying the need for a small scale iron ore reduction process. However, the processes heretofore proposed have been subject to the disadvantage that they either do not provide a high enough conversion of ore to metallic iron within an economically practicable period of time, or use prohibitively expensive raw materials.

It is accordingly an object of the present invention to provide a novel method of making sponge iron from iron ore wherein a high conversion of the ore is achieved within a relatively short period of time. It is another object of the invention to provide a process of this type wherein the desired reduction of the ore is effected with plentiful and inexpensive raw materials. It is still another object of the invention to provide for treatment of a bed of iron ore a continuous supply of a reducing gas mixture that is of substantially uniform predetermined composition and is maintained at a substantially constant relatively high temperature. Other objects of the invention will be in part obvious and in part pointed out hereafter.

In the present process reduction of the ore is achieved by passing a reducing gas mixture through a bed of the comminuted ore in a known manner. The invention is primarily concerned with the mode of preparation of the reducing gas mixture, and the objects of the invention are achieved in general by preparing this mixture in a series of controlled steps as described hereafter. It has been found that by using a reducing gas mixture of the type and under the conditions disclosed herein, ore conversions of 80% to 90% can readily be obtained in periods of three to four hours.

In general the ore-treating reducing gas mixture of the present process is made from atmospheric air and a reducing gas containing hydrogen and carbon monoxide as its principal ingredients. The reducing gas high in hydrogen and carbon monoxide can be prepared in any of various known ways. For example, if the ore treatment is to be carried out in an area where natural gas is available, the natural gas can be mixed with steam and catalytically converted to hydrogen and carbon monoxide in accordance with a known commercial process. Alternatively the well-known water gas reaction can be used to produce a gas mixture of the desired composition.

In one of its broader aspects the present method comprises heating a stream of reducing gas of the type referred to above to a temperature within the range 1300° F. to 1750° F., separately preheating a stream of air to a temperature of 1300° F. to 1750° F., and continuously injecting into the heated gas stream a limited and controlled flow of the preheated air to cause a portion only of the reducing gas to be burned and thereby raise the temperature of the mixed gas stream to 1800° F. to 2250° F. The preheated air is desirably mixed with the preheated gas in the proportions of from 0.1 to 0.25 volume of air per unit volume of gas. The resulting hot reducing gas mixture is passed through a bed of ore, preferably downwardly therethrough, to achieve the desired reduction of the ore to metallic iron. The particular state of subdivision of the ore does not appear to be critical, a convenient particle size being 0.25 to 1.0 inch. If desired a beneficiated ore can be used.

It has been found that in order to attain the desired high conversion of ore to metallic iron in a practicable length of time, it is important to have a continuous source of reducing gas that can be easily and predeterminably controlled in respect to its temperature and also to some extent its composition. In the present method wherein separately preheated streams of gas and air are mixed and a portion of the gas burned to achieve the desired final temperature, this controllability and continuity can be easily attained. While it is true that the proportion of reducing constituents in the reducing gas is dimenished by oxidation when air is added, the advantages of the increased temperature achieved by such air addition outweigh the disadvantages of the diminished concentration of reducing constituents in the reducing gas. Also by preheating both the air and the gas, the desired relatively high temperature can be achieved without excessive dilution of the reducing gas with atmospheric nitrogen.

A further advantage of the present method is that the flow rate of the reducing gas and air can be conveniently regulated at points where the gases are at low temperature i.e. prior to preheating. Thus the practical difficulties involved in regulating gas flow at high temperatures are avoided.

In order to point out more fully the nature of the present invention a preferred embodiment of the present process will now be described in connection with the accompanying drawing which comprises a flow diagram of an iron ore reduction system capable of being used to carry out the process. The ore reduction system shown in the drawing comprises three reduction units generally deignated A, B and C respectively, each of which comprises a reducing gas preheater, an air preheater and a reactor. More particularly the system shown comprises the reducing gas preheaters 10a, 10b and 10c for preheating the reducing gas as described above, the air preheaters 12a, 12b and 12c for preheating air as described above, and the reactors 14a, 14b and 14c wherein the iron ore is reduced to sponge iron. Since the reduction units A, B and C are of similar construction only the unit A will be described in detail.

The reducing gas preheater 10a contains a helical coil 16a that is heated by the burners 18a which are mounted in spaced relation on a fuel gas header 20a. The reducing gas to be heated is supplied through a conduit 22a to the inlet of coil 16a wherein it is heated by burners 18a and leaves the preheater through conduit 24a. Burners 18a are supplied with fuel gas supply pipe 26a through a branch pipe 28a containing a regulating value 30a.

Air to be mixed with the reducing gas is preheated in the air preheater 12a which contains a helical coil 32a heated by the burners 34a that are mounted in spaced relation on the header 36a. Fuel gas is supplied to header 36a and burners 34a from supply conduit 26a through a branch conduit 38a containing a regulating valve 40a. Air to be preheated is supplied under pressure through a conduit 42a containing a regulating valve 44a to the inlet end of coil 32a and flows through the coil wherein it is heated to the desired temperature by the burners 34a. The preheated air leaves the preheater 12a through conduit 45a.

As indicated above the preheated reducing gas and air are mixed in the proper proportions to cause a partial combustion of the gas to increase the temperature of the resulting mixture by a predetermined amount without introducing an excessive nitrogen concentration in the mixture. Thereafter, the resulting reducing mixture is passed downwardly through a bed of comminuted iron ore.

Referring again to the drawing, reduction of the iron ore is effected batch-wise in a vertical cylindrical reactor 14a having a flanged cover 46a and containing the comminuted ore bed 48a that rests on a foraminous supporting plate 50a. Connected to the cover 46a there is a gas mixer 52a, the left-hand end 54a of which is connected to the conduit 45a to receive a stream of preheated air therefrom. The reducing gas conduit 24a is connected at a point 56a on the side of the mixer to supply a continuous stream of preheated reducing gas to the mixer. The partial combustion of the reducing gas referred to above takes place within the mixer 52a. The resulting reducing gas mixture flows from mixer 52a into reactor 14a, down through the bed 48a wherein it reduces the iron ore to sponge iron, and out through a gas discharge pipe 58a.

The reduction units B and C are similar to unit A and the several parts thereof are identified by the same numbers used for corresponding parts of unit A with the letters "b" and "c" used in conjunction with the numerals to indicate that the part is incorporated in unit B or C respectively.

Referring to the lower left portion of the drawing, reducing gas composed largely of hydrogen and carbon monoxide, which may be made in the manner described above, is supplied to the several units A, B and C through a gas main 100 which is connected to the reducing gas supply pipes 22a, 22b and 22c of the units A, B and C respectively. Pipes 22a, 22b and 22c are provided with the valves 60a, 60b and 60c respectively for selectively connecting main 100 to supply any of the units A, B and C and regulating the flow of gas thereto.

It has been found that when a gas relatively rich in reducing constituents is used, the gas leaving the reactors 14a, 14b and 14c through the pipes 58a, 58b and 58c respectively after a single pass through the ore bodies still contains sufficient reducing power so that it can be advantageously re-used for ore reduction. Hence the present system includes a provision for recycling this partially used reducing gas. For convenience the fresh incoming reducing gas will be referred to as the primary reducing gas and the gas leaving the reactors 14a, 14b and 14c after having made a single pass therethrough will be called secondary gas.

Referring again to the drawing, the pipes 58a, 58b and 58c are selectively connectable by means of valves 62a, 62b and 62c respectively with a secondary gas recycle pipe 102. The primary gas after passing through the bed of ore contains a considerable amount of water vapor formed as an incident of the reduction reaction and this water is desirably removed from the secondary gas before it is re-used. Accordingly, the secondary gas is conducted through recycle gas pipe 102 to a quencher 104 provided with water sprays 106 supplied by water through a pipe 108. Within quencher 104 the secondary gas flows counter-current to the sprayed water and is thereby cooled and dehumidified. The dehumidified secondary gas leaves the quencher through the pipe 112 and the spray water leaves the quencher through the pipe 110. The pipe 112 is selectively connectable to any of the reducing gas supply pipes 22a, 22b and 22c by means of the valves 64a, 64b and 64c respectively. If desired the secondary gas can be enriched by mixing a proportion of primary gas therewith.

When the secondary gas has made a second pass through the ore bed it is rejected from the system. Referring again to the drawing, the reactor discharge pipes 58a, 58b and 58c are selectively connectable by means of valves 66a, 66b and 66c respectively with a reject gas header 114, through which the reject gas is conducted from the system. It may be noted that the reject gas still has a significant heating value and may be used as fuel in a boiler or for other heating purposes.

In order to point out more fully the nature of the invention a specific example of the mode of operation of a system such as that shown in the drawing will now be described. In this example the units A, B and C are operated on a six hour cycle in which each unit is maintained "on stream" that is, with reducing gas flowing through the ore bed during a four hour period, and the reactor is dumped and reloaded during a further two hour period. During the four hour period that each reactor is on stream it is supplied with secondary gas for a period of two hours and with primary reducing gas for a further period of two hours. It will be initially assumed that reactor 14a contains a fresh charge of ore 48a, that reactor 14b has been on stream for a period of two hours during which it was supplied with secondary reducing gas, and that the reduction of the ore 48c in reactor 14c has been completed and it is ready to be discharged. The ore used to charge the reactors may conveniently have a particle size of 0.25 to 1.0 inch.

Under the assumed conditions valves 60a and 62a of unit A are closed and valves 64a and 66a of unit A are open. Secondary gas flows through pipe 22a to preheater 10a and then through the coil 16a thereof wherein it is heated to about 1600° F. The preheated gas flows through pipe 24a to mixer 52a. Atmospheric air under pressure is supplied through pipe 42a to preheater 12a and flows through the coil 32a thereof wherein it is heated to 1600° F., thence through pipe 44a to mixer 52a. In accordance with the present example, the flows of gas and air are maintained at such values that the volumetric ratio of air to gas is maintained between 1:5 and 1:4.

Within the mixer 52a the gas and air are thoroughly mixed and a portion of the gas is burned by the oxygen of the air to increase the temperature of the mixture to about 2100° F. The hot reducing gas mixture flows downwardly through the bed of ore 48a and partially reduces the ore to sponge iron. After passing through the ore bed the gas mixture flows through pipe 58a to reject gas main 114. The reject gas still has a heating value of about 350 B.t.u. per cubic foot and hence can be used as a fuel gas.

Referring to unit B, the valves 60b and 62b are open and the valves 64b and 66b are closed. Primary reducing gas from the main 100 flows through pipe 22b to the preheater 10b. The primary gas has approximately the following composition: hydrogen 72%; carbon monoxide 14%; carbon dioxide 7%; methane 5%; water 1%; nitrogen 1%. The primary gas flows through the coil 16b of preheater 10b wherein it is heated to 1600° F. and thence through pipe 24b to mixer 52b. Atmospheric air is preheated in preheater 12b to 1600° F. and flows through pipe 44b to mixer 52b. The volumetric ratio of air to primary reducing gas is maintained between 1:5 and 1:4. In the mixer 52b the air and primary reducing gas are mixed and a portion of the primary gas is burned by the oxygen of the air to produce a gas mixture having a temperature of about 2100° F. The approximate composition of this gas mixture is as follows: hydrogen 57%; carbon monoxide 18%; nitrogen 14%; water 7%; carbon dioxide 2%; methane 2%. It will be noted that both the carbon dioxide content and methane content of the gas are reduced by the reaction in mixer 52b. This mixed gas is passed downwardly through the bed 48b of reactor 14b. As indicated above, the bed 48b is in a partially reduced condition since it has been previously treated for a period of two hours with secondary gas. At the end of a two-hour period of treatment with primary gas modified as described by admixture with air the ore bed 48b is reduced to sponge iron to the extent of about 90%.

The primary reducing gas mixture from reactor 14b flows through pipe 58b to the recycle gas pipe 102 and thence to the quencher 104 wherein it flows upwardly counter-current to a water spray. In the quencher 104 the temperature of the recycled gas is reduced to slightly above atmospheric temperature and a substantial proportion of its water content is removed. The gas then flows from quencher 104 to the secondary gas supply pipe 112. The approximate composition of this secondary gas is as follows: hydrogen 50%; carbon monoxide 14%; nitrogen 16%; carbon dioxide 12%; methane 1%; and water 7%. While unit A is operating on secondary gas and unit B on primary gas in the manner described, the reactor 14c of unit C is being discharged and refilled. During this period the inlet and outlet valves 60c, 62c, 64c and 66c are of course all closed. At the end of two hours of operation in the manner described above unit C is placed on stream using secondary reducing gas as a reducing agent, unit A is left on stream but with a change from secondary gas to primary gas as the reducing agent, and unit B is shut down for discharge and reloading of its reactor 14b.

It is apparent from the foregoing description that the present invention provides a process for producing sponge iron capable of achieving the several objectives set forth at the beginning of the present specification. The reducing gas and air are separately preheated to relatively high temperatures and then mixed to cause a part of the reducing gas to be burned to produce the further increase in temperature that is desirable for effective reduction of the iron ore. By separately preheating the gas and air to relatively high temperatures this further increment in temperature of the reducing gas mixture is achieved with a minimum loss of reducing constituents through oxidation by atmospheric oxygen and a minimum introduction of atmospheric nitrogen into the reducing gas. Moreover by operating at a relatively high temperature of the order of 2100° F. the $CO_2$—$CO$ equilibrium is shifted in such a manner as to reduce the $CO_2$ content of the gas.

It will of course be understood that the foregoing description is intended to be illustrative only and that numerous changes can be made in the ingredients, proportions and conditions specifically disclosed without departing from the spirit of the invention as defined in the appended claims. As indicated above the state of subdivision of the ore may vary widely and a beneficiated ore may be used if desired. If the secondary gas is too low in reducing constituents, it may be enriched by addition of primary gas thereto. The flows of air, reducing gas, fuel gas and water can be regulated by automatic controllers in accordance with known and commonly used industrial practice. Other types of indirect heaters such as tube or pipe heaters may be substituted for the coil heaters shown. Other modifications within the scope of the invention will be apparent to those skilled in the art.

I claim:

1. The method of reducing iron ore to produce sponge iron comprising the steps of heating a stream of reducing gas largely composed of hydrogen and carbon monoxide to a temperature of 1300° to 1750° F., separately heating a stream of air to a temperature of 1300° to 1750° F., continuously mixing the heated stream of air and heated stream of reducing gas in the proportions of from 0.1 to 0.25 part by volume of air per part of reducing gas to cause a portion only of said hydrogen and carbon monoxide to be burned to yield a gas mixture having a temperature of 1800° to 2250° F., and passing said mixture through a bed of iron ore to reduce the ore to sponge iron.

2. The method of claim 1 and wherein said mixture is passed downwardly through the bed of ore.

3. The method of reducing iron ore to produce sponge iron comprising the steps of passing a stream of reducing gas largely composed of hydrogen and carbon monoxide through a tube of a tubular heater, heating the exterior of said coil to raise the temperature of said stream of reducing gas at the outlet of said tube to 1300° to 1750° F., passing a stream of air through a tube of a second tubular heater, heating the exterior of said tube of said second tubular heater to raise the temperature of the air stream at the outlet of said tube to 1300° to 1750° F., continuously mixing the heated stream of air and heated stream of reducing gas in the proportions of from 0.1 to 0.25 part by volume of air per part only of said hydrogen and carbon monoxide to cause a portion of the reducing gas to be burned to yield a gas mixture having a temperature of 1800° to 2250° F., and passing said mixture downwardly through a bed of iron ore to reduce the ore to sponge iron.

4. The method of reducing iron ore to produce sponge iron comprising the steps of, heating a stream of reducing gas largely composed of hydrogen and carbon monoxide to a temperature of about 1600° F., separately heating a stream of air to a temperature of about 1600° F., continuously mixing the heated stream of air and heated stream of reducing gas in the proper proportions to cause a portion only of said hydrogen and carbon monoxide to be burned to yield a gas mixture having a temperature of about 2100° F. and passing the resulting mixture through a bed of iron ore to reduce the ore to sponge iron.

5. The method of reducing iron ore to produce sponge iron comprising the steps of preheating a stream of a reducing gas largely composed of hydrogen and carbon monoxide, the volumetric proportion of carbon monoxide in said reducing gas being not substantially greater than the volumetric proportion of hydrogen therein, separately pre-heating a stream of atmospheric air, continuously mixing the heated stream of air and heated stream of reducing gas in the proportions of from 0.1 to 0.25 part by volume of air per part of reducing gas to cause a portion of the reducing gas to be burned to yield a gas mixture having a temperature of 1800° to 2250° F., and passing said mixture through a bed of iron ore to reduce the ore to sponge iron.

6. The method of reducing iron ore to produce sponge iron comprising the steps of pre-heating a stream of a reducing gas largely composed of hydrogen and carbon monoxide, the volumetric proportion of carbon monoxide in said reducing gas being not substantially greater than the volumetric proportion of hydrogen therein, separately pre-heating a stream of atmospheric air, continuously mixing the heated stream of air and heated stream of reducing gas to cause a portion only of said hydrogen and carbon monoxide to be burned to increase the temperature of the mixture, and passing said mixture through a bed of iron ore to reduce the ore to sponge iron.

7. The method of reducing iron ore to produce sponge iron comprising the steps of pre-heating a stream of a reducing gas, separately pre-heating a stream of atmospheric air, continuously mixing the heated stream of air and heated stream of reducing gas to cause a portion of the reducing gas to be burned to increase the temperature of the mixture, controlling the flow of said gas stream and the flow of said air stream prior to pre-heating to cause said air and gas to be mixed in the proportions of 0.1 to 0.25 part by volume of air per part by volume of gas, and passing said mixture through a bed of iron ore to reduce the ore to sponge iron.

8. The method of reducing iron ore to produce sponge iron comprising the steps of heating a stream of reducing gas largely composed of hydrogen and carbon monoxide to a temperature of 1300° to 1750° F., separately heating a stream of air to a temperature of 1300° to 1750° F., continuously mixing the heated stream of air and heated stream of reducing gas to cause a portion only of said hydrogen and carbon monoxide to be burned to yield a gas mixture having a temperature of 1800° to 2250° F., controlling the flow of said gas stream prior to heating and the flow of said air stream prior to heating to cause said air and gas to be mixed at a volumetric ratio between 1:10 and 1:4, and passing said mixture through a bed of iron ore to reduce the ore to sponge iron.

9. The method of reducing iron ore to produce sponge iron comprising the steps of passing a stream of reducing gas largely composed of hydrogen and carbon monoxide through the coil of a first coil heater, heating the exterior of said coil to raise the temperature of said stream of reducing gas at the outlet of said coil to 1300° to 1750° F., passing a stream of air through the coil of a second coil heater, heating the exterior of the coil of said second coil heater to raise the temperature of the air stream at the outlet of said coil to 1300° to 1750° F., continuously mixing the heated stream of air and heated stream of reducing gas to cause a portion only of said hydrogen and carbon monoxide to be burned to yield a gas mixture having a temperature of 1800° to 2250° F., controlling the flow of said gas stream prior to its entry into said first heater and the flow of said air stream prior to its entry into said second heater to cause the heated air and gas streams to be mixed at a volumetric ratio between 1:10 and 1:4, and passing said mixture downwardly through a bed of iron ore to reduce the ore to sponge iron.

References Cited in the file of this patent

UNITED STATES PATENTS

| | | |
|---|---|---|
| 1,591,470 | Constant | July 6, 1926 |
| 2,399,984 | Caldwell | May 7, 1946 |
| 2,540,593 | Ogorzaly | Feb. 6, 1951 |
| 2,577,730 | Benedict | Dec. 11, 1951 |
| 2,638,414 | Lewis | May 12, 1953 |
| 2,653,088 | Pike | Sept. 22, 1953 |
| 2,739,055 | Gallusser | Mar. 20, 19556 |

FOREIGN PATENTS

| | | |
|---|---|---|
| 535,085 | Canada | Dec. 25, 1956 |